No. 1,306.
G. D. METTETAL.
SAUSAGE MAKER.
PATENTED AUG. 29, 1839.
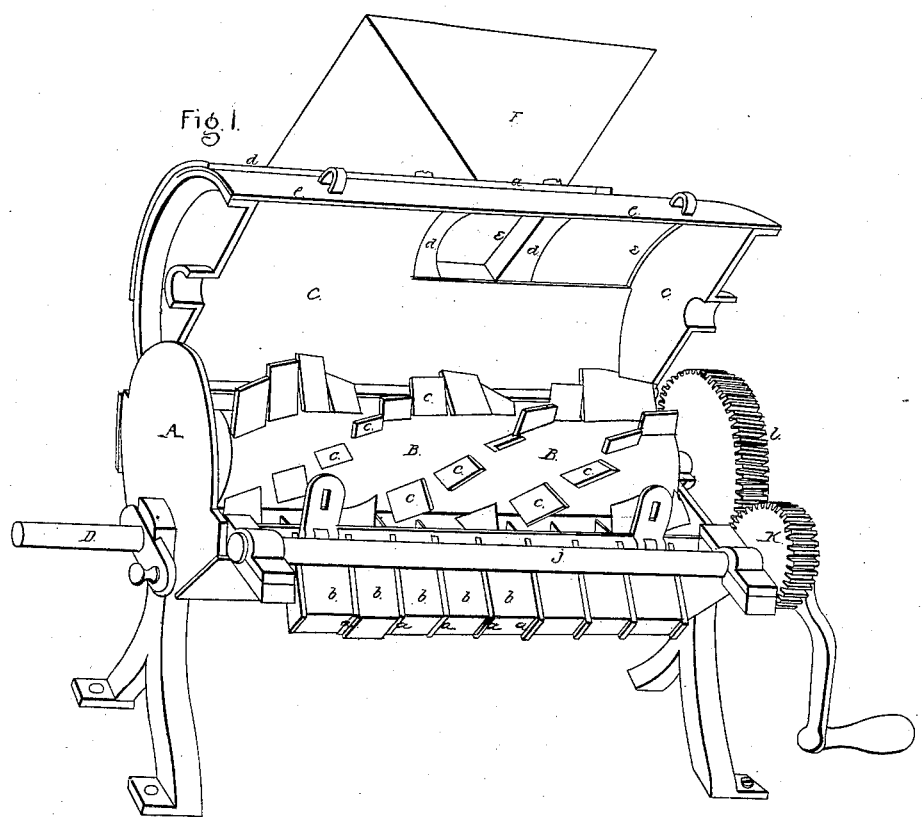
Fig. 1.
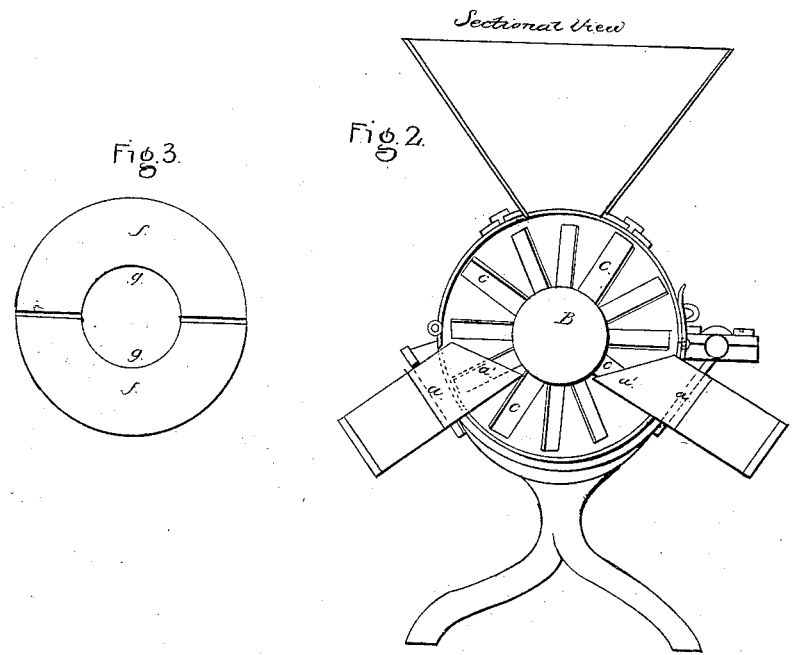
Fig. 3.
Fig. 2.
Sectional View

UNITED STATES PATENT OFFICE.

G. D. METTETAL, OF PITTSBURGH, PENNSYLVANIA.

MACHINE FOR MAKING SAUSAGES.

Specification of Letters Patent No. 1,306, dated August 29, 1839.

*To all whom it may concern:*

Be it known that I, G. D. METTETAL, of the city of Pittsburgh, in the State of Pennsylvania, have invented an Improved Machine for Cutting Sausage-Meat and Stuffing Sausages, which I denominate the "Sausage-Makers;" and I do hereby declare that the following is a full and exact description thereof.

The body of this machine within which the cutting is to be effected is a hollow cylinder which I usually make of sheet iron, fourteen inches long, and six inches in diameter, deeming this a good general size. This cylinder is furnished with two heads, and is placed upon a suitable stand in a horizontal position. It is to be divided horizontally into two equal parts, and the upper part is to be hinged, or otherwise attached, to the lower part, so that it can be opened and closed at pleasure. I insert two rows of knives in the lower portion of the cylinder. These knives pass into the cylinder through slots or openings just below each edge of its lower segment, and they may be three fourths of an inch apart, more or less, as may be preferred. They are to be secured in their places by wedges, or by other suitable means, on the outside of the cylinder, admitting of their being readily removed and replaced. The portion within the cylinder is of a triangle form, each knife presenting an oblique cutting edge to the meat or other article to be cut. A cylindrical shaft, which may be two inches and a half in diameter, is made to revolve within the cylinder, its gudgeons being supported by the two heads. To this shaft is attached a number of wings, or leaves, which are to pass between the respective knives, occupying, as nearly as may be, the whole space between them and the shaft and cylinder. There may be four such wings or leaves attached to the shaft, to pass between each pair of knives. They are set spirally into the shaft, and their planes stand obliquely with its axis, forming sections of the thread of a screw, each being inclined in the same direction, so as to carry the meat, or other article, from the feeding to the delivering end of the machine. The meat, when cut, passes out through a tube at one end of the machine, and when it is to be stuffed into gut, said gut is to be drawn on to the tube, as in other sausage machines.

When the machine is to be used the upper section of the cylinder is to be close down upon the lower, and held in place by suitable clasps. The meat is to be fed in through a hopper placed on the upper side of the cylinder for that purpose. This hopper is not attached directly to the cylinder, but to a sliding shutter, which runs in grooves upon the cylinder. The object of this contrivance is to enable me to lengthen or shorten the machines at pleasure, and thus to regulate the cutting according to the fineness which it may be desired to give to the material. As it is required to be less fine the hopper is slid toward the delivering end, and the material is consequently exposed to the action of a smaller number of knives. There is an opening in the upper section of the cylinder, which is covered by the sliding shutter, to admit of this arrangement. When the machine is shortened a false head is put into the cylinder, to permit the passing of the meat back into the unoccupied portion of the machine.

In the accompanying drawing Figure 1 is a perspective view of the machine; Fig. 2 a cross section of it, and Fig. 3 the false head for shortening it when desired.

A is one head of the cylinder within which revolves the shaft B, B. The upper section C, C, of the cylinder is shown as turned back for the purpose of showing the parts within it.

*a, a, a,* are the knives, which are confined in place by wedges *b, b, b,* or by screws, or other proper means on the outside of the cylinder. The portion of them passing into the cylinder is shown at *a′, a′,* Fig. 2.

*c, c, c,* are the leaves, or wings which are attached to the shaft B, B, their planes forming an angle with the axis of the cylinder and filling the spaces between two contiguous knives, so as to force the material to be cut, in their ascent and descent, against the oblique edges of the knives *a′, a′,* Fig. 2, while they give it a progressive motion, proportion to their obliquity, along the cylindrical body of the machine, toward the head A, where D, is the tube of delivery, upon which the gut to be stuffed is to be drawn.

E, E is a longitudinal opening in the upper part of the cylinder, which is to be as wide as the bottom of the hopper F, and three or four times as long, so as to admit the sliding of the hopper toward or from the end A, of the machine.

*d, d,* is a part of the sliding shutter to which the hopper is attached, and which slides between ledges $e$, $e$.

The parts shown in Fig. 2, are designated by the same letters of reference as those marked on the same parts in Fig. 1.

The false head, Fig. 3, consists of two semicircular plates of metal $f$, $f$, which fit the interior of the cylinder A, C, and are hollowed out at $g$, $g$, so as to fit the shaft B, B. Their use has been already explained, and, when employed, they occupy the place of two of the knives $a'$, $a'$.

I am aware that machines for cutting sausage meat, and other articles, have been constructed in a manner somewhat similar to that above described. Knives, for example, have been placed within a hollow cylinder, and around a revolving shaft within it, the latter having been placed obliquely for the purpose of forcing the cut material toward one end of the cylinder. The substitution, however, of the leaves, or wings, $c$, $c$, for such knives is a decided improvement, as they insure the more perfect cutting of the article to be operated upon, by forcing it against the fixed knives within the cylinder.

What I claim, therefore, in the cutting part of this machine, as of my invention, and desire to secure by Letters Patent, is—

1. The affixing the knives $a$, $a$, by passing them through slots in the lower section of the cylinder, and securing them in place by wedges $b$, $b$, on the outside of the cylinder, thus admitting of their ready removal for sharpening, and their perfect adjustment in their places.

2. I claim the arrangement for shifting the hopper, so as to lengthen or shorten the machines at pleasure, and in combination therewith, the employment of the false head, as described; and I will here remark that instead of placing the hopper upon a sliding shutter, it may be placed upon a plate which may be affixed on the top of the machine by screws, clasps, &c. I do not intend, therefore, to limit myself to the precise mode of construction herein described, but to vary this as I may think proper while the improvements devised by me remain substantially unchanged.

I have represented the machine as operated by means of a wrench $i$, turning a shaft $j$, upon which a pinion $k$, takes into a spin wheel $l$, upon this shaft B, but it may be driven by other means. I will remark also, that I intend sometimes to construct my machine of a large size for the purpose of cutting roots, or other articles, to which it may be advantageously applied.

G. D. METTETAL.

Witnesses:
    THOS. P. JONES,
    ISAAC BABBITT.